May 12, 1970     E. S. MARVIN     3,511,948
TRIGGER MECHANISM FOR MOTION PICTURE CAMERA OR THE LIKE
Filed July 26, 1968     4 Sheets-Sheet 1
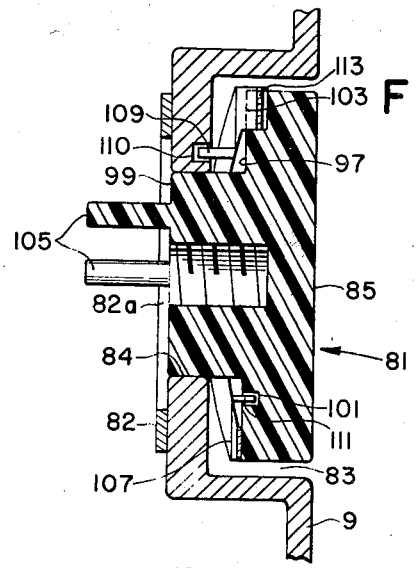
FIG. 12
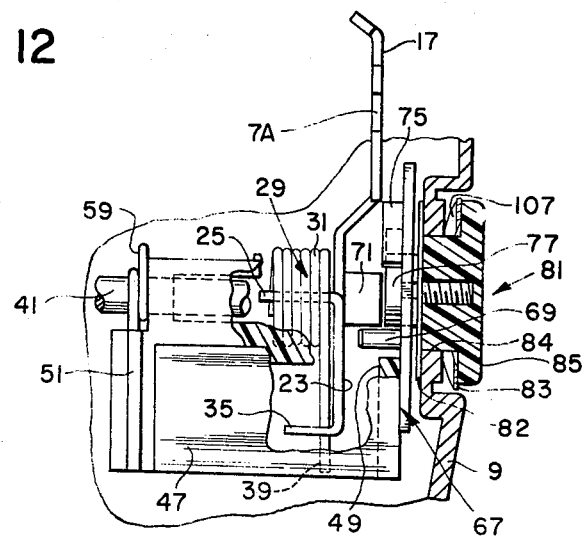
FIG. 2
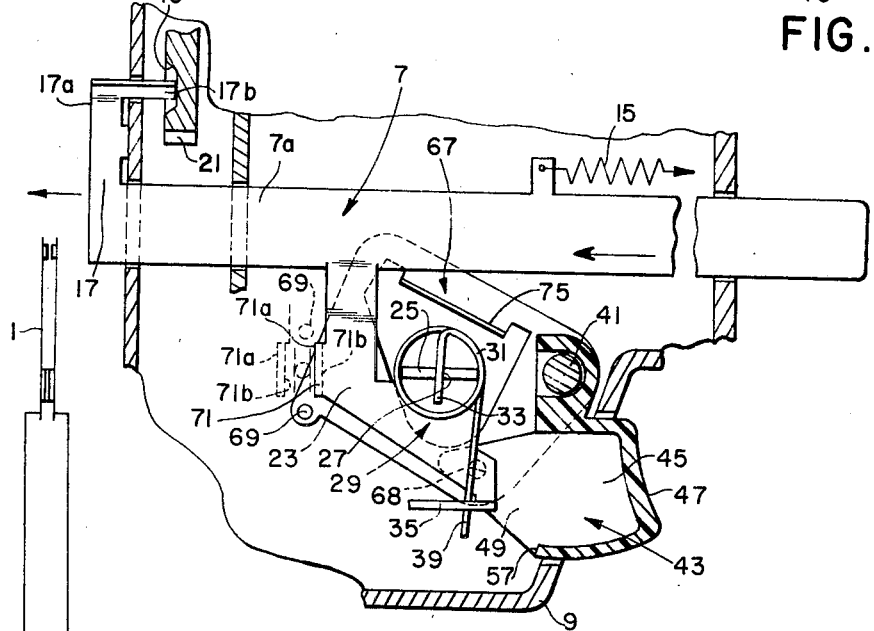
FIG. 1
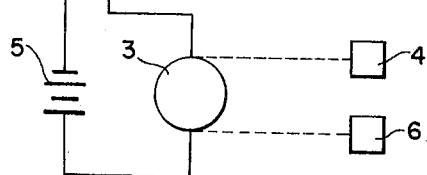
EDGAR S. MARVIN
INVENTOR.
BY J. Herman Childress
Robert W. Hampton
ATTORNEYS May 12, 1970  E. S. MARVIN  3,511,948
TRIGGER MECHANISM FOR MOTION PICTURE CAMERA OR THE LIKE
Filed July 26, 1968  4 Sheets-Sheet 2

EDGAR S. MARVIN
INVENTOR.

BY *S. Herman Childress*
*Robert W. Hampton*
ATTORNEYS

May 12, 1970   E. S. MARVIN   3,511,948
TRIGGER MECHANISM FOR MOTION PICTURE CAMERA OR THE LIKE
Filed July 26, 1968   4 Sheets-Sheet 3
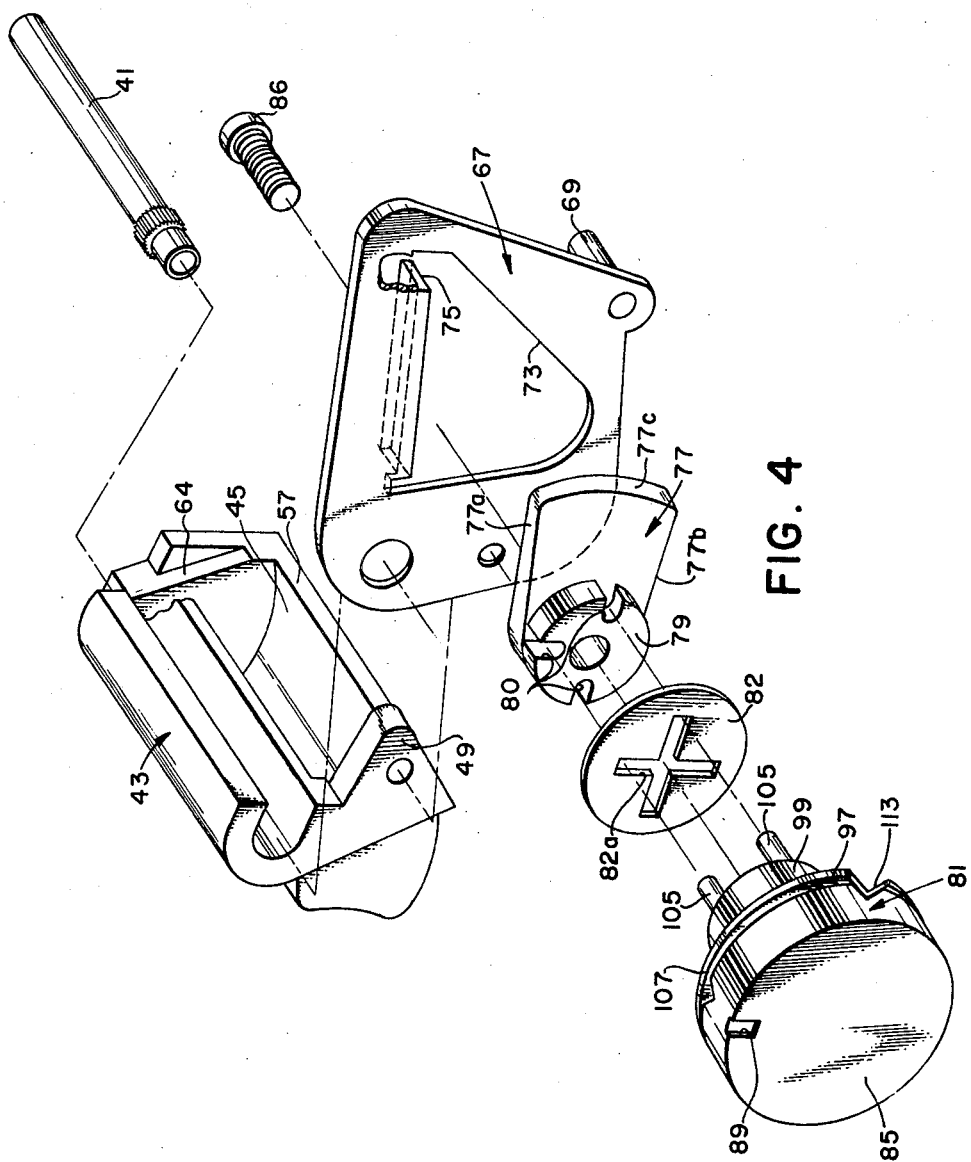
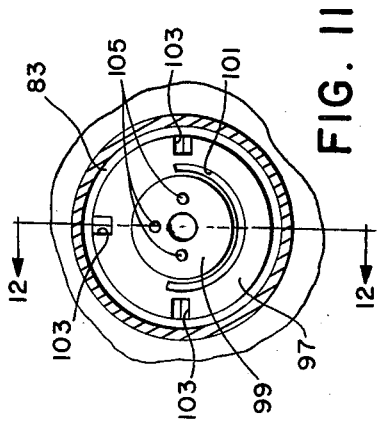
EDGAR S. MARVIN
INVENTOR.
BY
ATTORNEYS May 12, 1970 E. S. MARVIN 3,511,948
TRIGGER MECHANISM FOR MOTION PICTURE CAMERA OR THE LIKE
Filed July 26, 1968 4 Sheets-Sheet 4

EDGAR S. MARVIN
INVENTOR.

BY *H. Herman Childress*
*Robert W. Hampton*
ATTORNEYS

United States Patent Office 3,511,948
Patented May 12, 1970

3,511,948
TRIGGER MECHANISM FOR MOTION PICTURE CAMERA OR THE LIKE
Edgar S. Marvin, Rochester, N.Y., assignor to Eastman Kodak Company, Rochester, N.Y., a corporation of New Jersey
Filed July 26, 1968, Ser. No. 747,957
Int. Cl. G03b 1/00
U.S. Cl. 200—52   12 Claims

ABSTRACT OF THE DISCLOSURE

A trigger mechanism is operative to instantaneously initiate or terminate operation of a motion picture camera or the like. Furthermore, the trigger mechanism provides the device with which it is operative with three operating conditions, i.e., a "lock" condition wherein the camera is maintained inoperative; a normal "run" condition wherein the camera can be manually rendered operative or inoperative; and a "continuous-run" condition wherein the camera is maintained operative. Operation of the camera is automatically initiated by changing the operating condition to "continuous-run."

CROSS-REFERENCES TO RELATED APPLICATIONS

Reference is made to the commonly assigned U.S. Pat. application Ser. No. 611,113, entitled "Trigger Mechanism for a Movie Camera or the Like," filed in the name of Edgar S. Marvin on Jan. 23, 1967 and now U.S. Pat. No. 3,476,471.

BACKGROUND OF THE INVENTION

Field of the invention

This invention relates to an improved trigger mechanism for a motion picture camera or the like.

Description of the prior art

Trigger mechanisms for providing various operating conditions for a motion picture camera or the like are well known in the art. The co-pending U.S. Pat. application Ser. No. 611,113 entitled "Trigger Mechanism for a Motion Picture Camera or the Like" filed in the name of Edgar S. Marvin on Jan. 23, 1967, discloses a trigger member having a first end which is finger-engageable and a second end which is adapted to energize an electrical circuit and thereby render the camera operative. The mechanism disclosed in said application also includes a rotatably-mounted member movable, by manual actuation thereof, into each of three positions. The interaction of these two members provides the camera with three operating conditions, i.e., a "lock" condition wherein the trigger mechanism is disabled and the device cannot be operated; a normal "run" condition wherein the camera can be rendered operative or inoperative by engaging the trigger member to energize or de-energize an electrical circuit; and a "continuous-run" condition wherein, once operation of the camera has been initiated, the camera is automatically maintained in an operative condition without the necessity of holding the trigger member engaged.

Another similar trigger mechanism is disclosed in British Pat. No. 927,117. This mechanism also provides the three aforementioned operating conditions for a motion picture camera, plus a fourth one which permits the camera to take still or single-frame pictures.

However, the prior art mechanisms do not render the camera instantaneously and positively operative or inoperative in a foolproof manner. When an attempt is made to render a camera operative or inoperative, with the prior art mechanisms, the camera may fluctuate between operative and inoperative conditions if movement of the trigger means is effected in an unsteady manner. This fluctuation, which can be referred to as a "machine-gunning" effect, can result in wasted film and is therefore not compatible with satisfactory motion picture taking operation. Secondly, with the prior art device, the camera operator cannot change the condition of the camera to "continuous-run" from one of the other conditions to automatically render the camera operative without first manually engaging the trigger.

SUMMARY OF THE INVENTION

An object of the invention is to provide means for rendering a motion picture camera or the like instantaneously and positively operative or inoperative in a foolproof manner, thereby circumventing the problem of the "machine-gunning" effect. Another object of the invention is to provide means for changing the operating condition of the camera or the like to a "continuous-run" condition to automatically render the camera operative without first manually engaging the trigger. Other objects, features and advantages of the invention will become apparent from the following description:

A device-actuating mechanism of this invention comprises activating means for rendering the device inoperative or operative. The mechanism has trigger means which is movable between a first and second position. The trigger means has a first portion for moving the activating means and a second portion which is movable with respect to the activating means to first restrain movement of the activating means and then to release the activating means for movement to the other one of its positions from said one of its positions. This delayed action or last motion is used to effect positive and instantaneous operation of the activating means to prevent the "machine gunning" effect previously mentioned. Another feature of the invention is the provision of a control means which is capable of effecting movement of the trigger means to place the device in a continuous run condition without manually operating the trigger.

BRIEF DESCRIPTION OF DRAWINGS

FIG. 1 is a fragmentary side elevation view of a preferred specific embodiment of a trigger mechanism of the invention in its inoperative position with certain parts being omitted for clarity;

FIG. 2 is a partial section of the trigger mechanism viewed from the right in FIG. 1;

FIG. 4 is an exploded view of the assembly of the trigger, plate, cam, and knob;

FIG. 11 is a rear elevation view of the knob;

FIG. 12 is an enlarged cross-sectional view taken on line 12—12 of FIG. 11; and

DESCRIPTION OF THE PREFERRED EMBODIMENT

Figure 3:
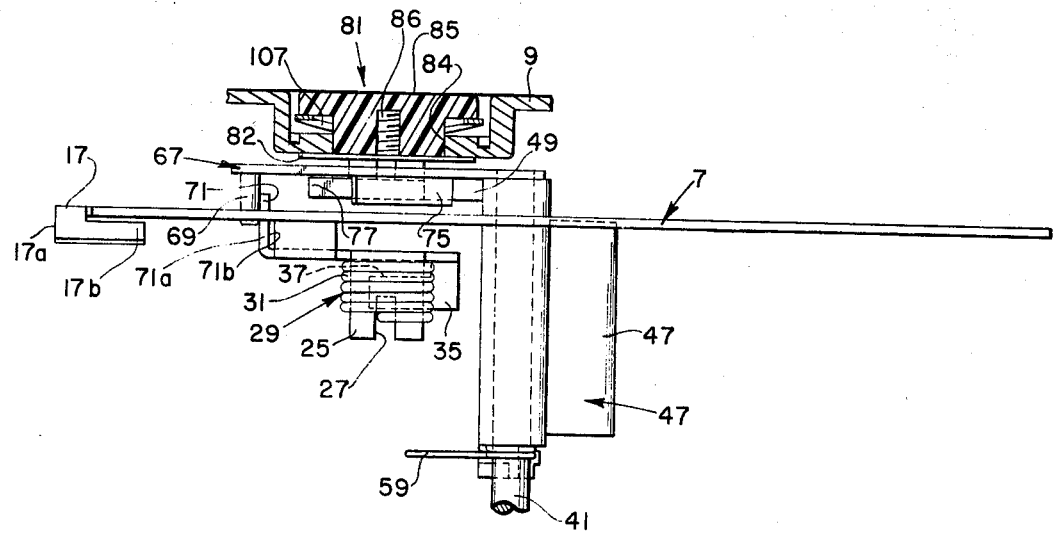
FIG. 3 is a plan view of the mechanism shown in FIG. 2.

Referring to the drawings, a trigger mechanism is disclosed for use in a motion picture camera shown schematically in FIG. 1. The camera becomes operative when a pair of normally open switch contacts 1 are brought together. This action closes a circuit between an electric motor 3 and a source of power 5 to drive a power train (not shown) which rotates a shutter (not shown) past a diaphragm (not shown). As is well known in the art, the motor 3 drives a film pulldown mechanism 4 and a takeup spool 6 to advance film (not shown) past the diaphragm where successive frames of the film are exposed.

The trigger mechanism has an activating bar 7 disposed within the camera housing 9 which is mounted for rectilinear movement between a first position (FIG. 7) wherein the camera is inoperative and a second position (FIG. 9) wherein the bar 7 renders the camera operative by bringing the switch contacts 1 together. A spring, diagrammatically shown at 15, biases the bar 7 towards its first position wherein the camera is inoperative because the switch contacts are separated. The bar 7 comprises an elongate, stem-like portion 7a and two substantially parallel flanges 17 and 23 projecting therefrom.

Flange 17 is generally hook-shaped and includes a first end portion 17a which engages one of the pair of switch contacts 1 to bring the contacts together as the bar 7 is moved to the left into its second position. As the bar is moved to the right toward its first position, the switch contacts 1 separate to stop motor 3 and a second end portion 17b of the flange 17 moves into engagement with a rotating gear 21 comprising part of the power train. When a recessed surface 19 in gear 21 becomes aligned with the end portion 17b, end portion 17b enters the recess and engages surface 19 to brake the gear train. Thus, the camera is rendered inoperative and the activating bar is then in its first position.

It is well known in the prior art that when camera operation is being terminated, the power train should be stopped only when the shutter is in a closed position (i.e., when the shutter is positioned across the camera's diaphragm) to prevent continued exposure of the film. Therefore, the flange 17 and the surface 19 are so oriented that they are aligned only when the shutter is in its closed position.

The second flange 23 has three projections 25, 35 and 71 extending perpendicularly therefrom (FIG. 3). Projection 25, has a slot 27 therein which serves to support a coil spring 29 comprising a central portion 31 coiled about projection 25 and two substantially linear end portions 33 and 39. End portion 33 of the spring is positioned in the slot 27 to restrict rotational movement of the coiled portion 31. Projection 35 is generally hook-shaped and has a recess 37 (FIG. 3) which receives the second end portion 39 of the spring. Application of a force to end portion 39 to cause it to move in a clockwise direction (as viewed in FIG. 1) results in the bar being urged to move to the left from its first position toward its second position. Projection 71 (FIG. 1) has a front surface 71a and a rear surface 71b which are utilized to temporarily restrict movement of the activating bar between its first and second position as will be explained later.

Figure 13:
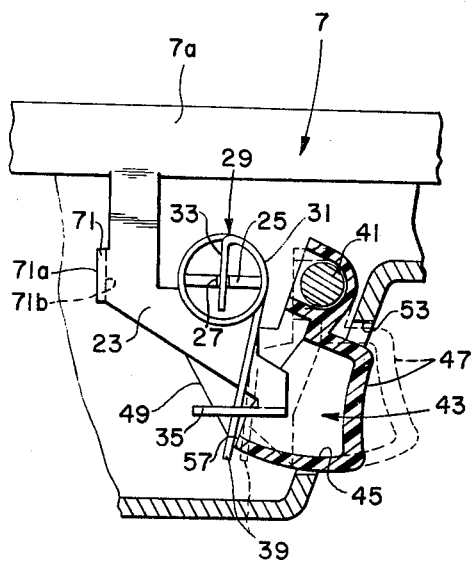
FIG. 13 is a simplified view, similar to FIG. 1, which illustrates movement of the trigger between two positions.

A shaft 41, supported by the camera housing, pivotally mounts a trigger 43 which is disposed in and extends through a camera housing opening 53. The trigger 43 is manually moved between a first inoperative position (FIG. 7) wherein the camera is inoperative and a second operative position (FIG. 9) wherein the camera is rendered operative in a manner explained more fully hereinafter. Movement of the trigger to its FIG. 9 position is accomplished by applying finger pressure to a surface 47 which projects to the outside of the camera housing through opening 53. A hollow or recessed portion 45 of the trigger opens into the camera and is positioned with respect to bar flange 23 to allow free movement of the trigger to its FIG. 9 position without interference from flange 23 (FIG. 13). A triangular portion 49 of the trigger projects into the camera from one side edge of hollow portion 45. Portion 49 is used for linking the trigger to other parts of the mechanism, as will be explained later. Extension of the trigger to the outside of the housing through opening 53 is limited by an abutment 51 (FIG. 2) in spaced relation to and on the side of the hollow portion 45 opposite from the triangular portion 49. The abutment is engageable with the interior of the camera housing adjacent opening 53. As the trigger 43 is moved from its inoperative (FIG. 7) position to its operative (FIG. 9) position, the lower interior edge 57 of the trigger contacts the end portion 39 of the spring and tends to impart a clockwise rotational motion thereto (FIG. 13) which, in turn, biases the activating bar 7 to the left for rendering the camera operative.

A second coil spring 59 (FIGS. 2, 3, 5, 7 and 9) mounted on the shaft 41, engages and biases the trigger 43 toward its inoperative position. This spring 59 comprises a central coiled portion 61 and two substantially linear end portions 63 and 65. A first end portion 63 of the trigger mounted spring is arranged to bear against an oblique surface 64 (FIG. 4) of the trigger adjacent hollow portion 45. The second end portion 65 of the spring bears against flange 66 on the camera housing. The spring 59 is always in compression and movement of the trigger toward its FIG. 9 position serves to further compress the spring.

A plate 67 is pivotally mounted on the shaft 41 and is attached at 68 to the projecting portion 49 of the trigger so that the plate is moved by the trigger. A pin 69 projects perpendicularly from one corner of the plate and, during movement of the plate and trigger to their FIG. 9 positions, the pin is engageable by the third projection 71 of the activating bar as explained more fully hereinafter. The plate also has a centrally located opening 73, and a planar projection 75 adjacent an edge of the opening 73. As will be explained later, projection 75 is engageable by a cam for swinging the plate and trigger into a "continuous-run" (FIG. 9) position.

Figure 5:
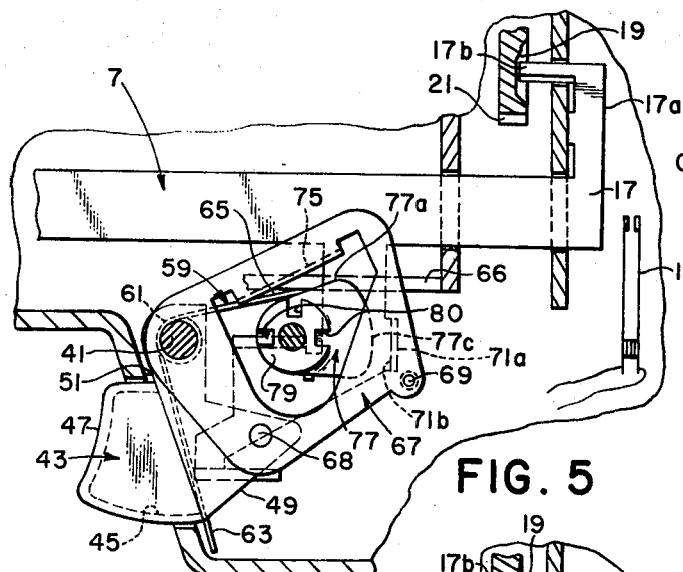
FIGS. 5, 7 and 9 are fragmentary views of the mechanism of the invention illustrating the parts in their "run," "lock" and "continuous-run" positions, respectively.
Figure 7:
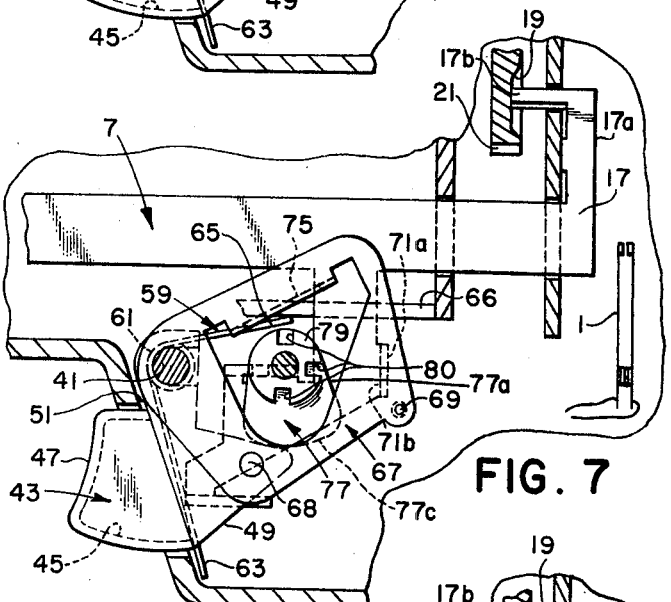
Figure 9:
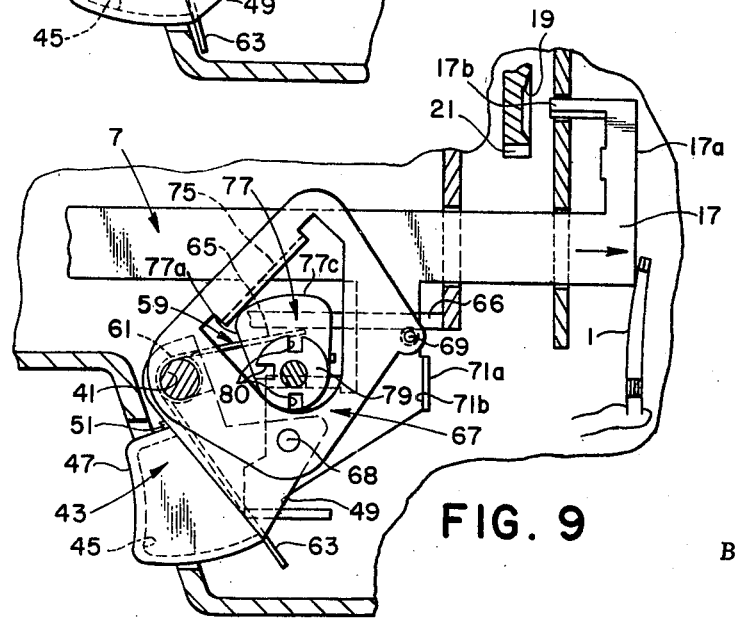

Referring to FIGS. 5, 7, and 9, a mechanism is provided for controlling operation of the camera in each of three separate operating conditions, i.e., a "run" condition (FIG. 5) wherein the trigger can be manually moved between its first and second positions to allow manual or normal operation of the camera when desired, a "lock" condition (FIG. 7) wherein the trigger is locked in its first position to prevent the camera from becoming operative, and a "continuous-run" condition (FIG. 9) wherein the trigger is locked in its second position to maintain the camera operative. This control mechanism comprises a rotatably mounted cam 77 (FIG. 4) extending through opening 73 and arranged with respect to plate 67 to be engageable with projection 75 (the cam has a flat substantially triangular lobe portion) having three edge surfaces 77a, 77b and 77c. Surface 77a is engageable with projection 75 and surface 77c is engageable with the trigger's triangular portion 49. The cam can rotate to each of the three separate positions thereby to control movement of the plate 67 and the trigger 43 attached thereto. The cam 77 also has a cylindrical button portion 79 having three recesses 80 equally spaced therein, over a 180 degree arcuate path.

Figure 8:
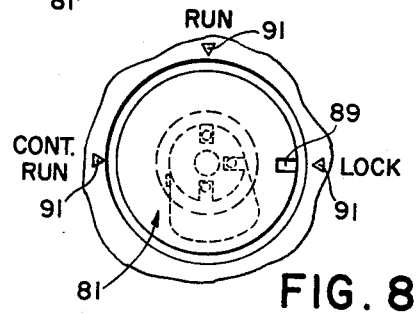
Figure 10:
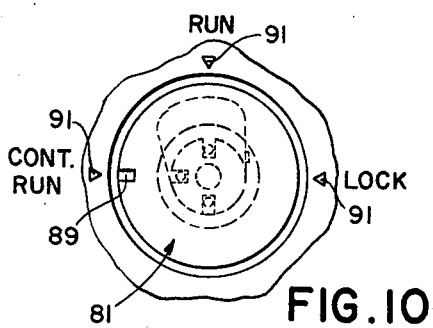

Referring to FIGS. 2, 4, 11 and 12, the control mechanism further comprises a manually movable knob 81 which is connected to the cam 77 by a bolt 86 so that rotation of the knob produces corresponding rotation of the cam 7. The knob 81 is partially disposed within a camera housing recess 83 and projects into a hole 84 in the camera housing 9. The knob has an outer face 85, with an indicator or condition mark 89 thereon visible from outside the camera housing 9. The knob can be rotated to align mark 89 with each of three position marks 91 (FIGS. 6, 8, 10), located on the exterior surface of the housing 9 adjacent the knob, which indicates the three camera operating conditions and accordingly are designated "run," "lock," and "continuous-run." As will be explained more fully hereinafter, alignment of the condition mark 89 with one of the position marks 91 indicates that the camera is in the operating condition corresponding to that position mark. Thus the purpose of the knob 81 is to permit manual selection of the camera operating condition by rotating the knob 81 and therefore the cam 77 between its three positions.

The knob's inner face (FIG. 11) has a larger diameter ring-shaped surface 97 and a smaller diameter circular surface 99. The surface 97 has a groove 101 extending along substantially a 180 degree arcuate path and three equally spaced recesses 103 along a substantially complementary 180 degree arcuate path. Three pins 105 project perpendicularly from surface 99 and lie along a 180 degree arcuate path. The pins are equally spaced from each other and their arcuate positions correspond with the radial positions of recesses 103. The pins 105 are received in recesses 80 in the cam when the cam and knob are assembled. The number and location of pins 105 on the knob and recesses 80 on the cam facilitate assembly and permit assembly of the knob and cam only when the parts are properly oriented with respect to each other. A detent member in the form of a bowed annular spring 107 (FIG. 12) is positioned within the recess 83 and bears against knob 81. The spring 107 has a first projection 109 which extends into a mating opening 110 in the camera housing to lock the spring 107 against rotation with respect to the camera housing. A second projection 111 on the detent spring projects into the knob groove 101 so that engagement between projection 111 and the ends of groove 101 restrict rotary motion of the knob to substantially 180 degrees. A generally V-shaped projection 113 on the detent spring is biased against the knob's ring-shaped surface 97 and is adapted to snap into any of the three recesses 103 in surface 97. The third projection 113 is located so that it is in register with a different one of the recesses 103 in the knob 81 when the knob is in each of its three possible positions corresponding to the three camera operating conditions.

Because the knob 81 and cam 77 are directly connected, a washer 82 having a cross-shaped slot 82a therein is placed between the cam 77 and the interior of the camera housing 9 to locate the trigger mechanism with respect to the housing 9. The pins 105 on the knob are adapted to project through washer slot 82a. The slot 82 is cross-shaped to allow it to be easily assembled on knob 81.

Figure 6:
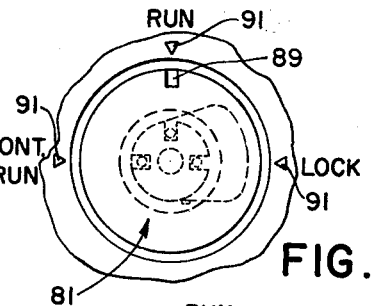
FIGS. 6, 8 and 10 are partial elevation views illustrating the front face of the knob and showing its positions when the parts are in the positions illustrated in FIGS. 5, 7 and 9, respectively.

In the operation of the mechanism, assume first that the camera is in its "run" condition (FIGS. 5 and 6). As finger pressure is exerted against surface 47 of the trigger 43 to move the trigger from its first to its second position, its edge 57 contacts end portion 39 of spring 29 to rotate this end portion, thereby to compress the spring. This rotation biases the activating bar 7 rectilinearly from its first position (FIGS. 5 and 7), wherein the camera is inoperative, toward its second position (FIG. 9) wherein the camera is rendered operative. Almost simultaneous with initial movement of the trigger 43 from its first position, the pin 69 moves into a position (shown in dashed lines in FIG. 1) with respect to bar flange 71 wherein the pin is engaged by flange surface 71a to interfere with or block movement of bar 7 to its second position. This blocking relation continues as the trigger and pin move through a series of positions. When the pin 69 has moved past this series of positions it no longer blocks movement of the bar, and the bar is forcefully and instantaneously moved to its second position by the compressive force which movement of the trigger has built up in spring 29. Upon the bar reaching its second position, the camera becomes operative because the activating bar 7 brings together the pair of flexible switch contacts 1 that are electrically connected to camera motor 3 and simultaneously removes bar flange 17 from recess 19. The motor 3, in turn, drives film pull-down mechanism 4 and take-up spool 6, as is well known in the art.

For the activating bar 7 to return from its second or operative position to its first or inoperative position, the trigger 43 must also return from its second position to its first position. When finger pressure is removed from trigger surface 47, the spring 59 urges the trigger 43 towards its normal inoperative position wherein abutment 51 on the trigger engages a wall of the camera housing. As this occurs, end 39 of spring 29 returns to its normal position within slot 37, thereby removing the biasing force which urges the bar to its second position. Simultaneously, the activating bar 7 is biased toward its first position by spring 15. However, as the trigger 43 moves from its second (FIG. 9) position, the pin 69 almost simultaneously moves behind flange 71 where it is engaged by surface 71b as the pin and trigger move through a second series of positions thereby to interfere with or block movement of the bar until the pin 69 has moved past this series of positions. After pin 69 moves out of engagement with flange 71, the activating bar 7 is forcefully and instantaneously biased by the spring 15 to its first position. Thus, this mechanism allows the activating bar 7 to instantaneously bring together or separate the electrical contacts by snap-type action as it moves to or from its second position. This assures instantaneous start and stop operation of the camera without the undesirable machine-gunning effect previously mentioned. Moreover, the blocking action resulting from engagement of pin 69 and flange surface 71b prevents a careless camera operator from placing the camera in its inoperative condition by failing to maintain full finger pressure against trigger surface 47. As is apparent from the foregoing description, the delayed action or last motion resulting from movement of the trigger while the bar is held against movement results in storage of energy in the spring, and that this energy is instantaneously released to effect positive engagement of the contacts 1 without the usual "machine gunning" effect.

Assume now that the knob 81 is moved to its "lock" (FIG. 8) position. This moves the cam surface 77c into engagement with the triangular portion 49 of the trigger in the manner shown in FIG. 7 and blocks movement of the trigger 43 from its inoperative position. The camera likewise remains inoperative.

The camera may be placed in a "continuous-run" condition by rotating the knob to the "continuous-run" (FIG. 10) position which moves the parts to the FIG. 9 position. During this action the cam surfaces 77a and 77c successively rotate into engagement with plate's projection 75 to move the plate and the trigger attached thereto to their operative positions. By doing this the activating bar is moved to its operative position and the camera is rendered operative. Furthermore, once the knob becomes fixed in this position by the detent spring, the camera will continue running until the knob is manually rotated from this position. Ordinarily the camera is placed in the "continuous-run" condition solely by rotation of knob 81. However, this step can be preceded by manual movement of the trigger to its "run" (FIG. 5) position, if desired.

The invention has been described in detail with particular reference to the preferred embodiment thereof, and it will be understood that variations and modifications can be effected within the spirit and scope of the invention as described hereinabove and as defined in the appended claims.

I claim:
1. A mechanism for actuating a device, said mechanism comprising:
trigger means adapted to place said device in an operative or an inoperative condition, said trigger means mounted for movement between a first position wherein said device is in its inoperative condition and a second position wherein said device is in its operative condition,
control means movable with respect to said trigger means between:
(a) a first location wherein said control means permits movement of said trigger means between its first position and its second position,
(b) a second location wherein said control means prevents movement of said trigger means to its second position from its first position, and
(c) a third location wherein said control means prevents movement of said trigger means to its first position from its second position;
said control means operatively connected to said trigger means when said control means is moved to its third location to effect simultaneous movement of said trigger means from its first position to its second position.

2. A mechanism as set forth in claim 1 wherein the control means comprises a rotatably mounted cam, and the trigger means has a surface adapted to engage the cam.

3. A mechanism as set forth in claim 1 and further comprising:
activating means movable between a first position wherein the device is inoperative and a second position wherein the device is rendered operative;
means biasing the activating means from its second position toward its first position; said trigger means further comprising:
(a) a first portion engageable with the activating means for moving said activating means against the force of said biasing means from its first position toward its second position as the trigger means moves from its first to its second position, and
(b) a second portion movable with respect to the activating means to move:
(i) to an interfering position wherein it restrains movement of said activating means from one of its positions to the other of its positions, and then
(ii) to a non-interfering position wherein it releases the activating means for movement to said other one of its positions from said one of its positions.

4. A mechanism as set forth in claim 1 further comprising camera activating means including:
(a) an activating bar movable between a first position wherein the camera is inoperative and a second position wherein the camera is rendered operative, and
(b) a spring mounted on the bar for biasing the bar towards its second position; and said trigger means further comprising:
(a) a first portion engageable with the spring when the trigger means moves from its first position to its second position so that the spring can react against said first portion therefore to bias the bar from its first position toward its second position, and
(b) a second portion movable with respect to the bar, as the trigger means moves from its first position to its second position, to move
(i) through a first range of positions wherein it restrains movement of said bar from its first position to its second position, and then
(ii) through a second range of positions wherein it releases the bar for movement its second position from its first position.

5. A mechanism as set forth in claim 4 wherein said camera activating means further comprises means for returning the bar from its second position to its first position; said second portion of said trigger means being moved with respect to the bar during movement of the trigger means from its second position to its first position so that said second portion moves:
(a) through a first range of positions wherein it restrains movement of said bar from its second position to its first position, and then
(b) through a second range of positions, wherein it has released said bar for return movement to its first position from its second position.

6. A mechanism for actuating a device comprising:
(a) activating means movable between a first position wherein the device is inoperative and a second position wherein the device is rendered operative,
(b) trigger means movable between a first and a second position comprising:
(i) a first portion engageable with the activating means for moving said activating means from its first position toward its second position as the trigger means moves from a first to its second position, and
(ii) a second portion movable with respect to the activating means to move:
(1) to an interfering position wherein it restrains movement of said activating means from one of its positions to the other one of its positions, and then
(2) to a non-interfering position wherein it releases the activating means for movement to said other one of its positions from said one of its positions.

7. A mechanism for actuating a motion picture camera comprising:
(a) a camera activating means comprising:
(i) an activating bar movable between a first position wherein the camera is inoperative and a second position wherein the camera is rendered operative,
(ii) a spring mounted on the bar for biasing the bar towards its second position,
(b) trigger means movable between a first position and a second position for effecting movement of the bar from the first position of the bar to the second position of the bar, the trigger means comprising:
(i) a first portion engageable with the spring when the trigger means moves from its first position to its second position so that the spring can react against said first portion therefore to bias the bar from its first position toward its second position, and
(ii) a second portion movable with respect to the bar, as the trigger means moves from its first position to its second position, to move:
(1) through a first range of positions wherein it restrains movement of said bar from its first position to its second position, and then
(2) through a second range of positions wherein it releases the bar for movement to its second position from its first position.

8. A mechanism as set forth in claim 7 wherein said camera actuating means further comprises means for returning the bar from its second position to its first position, said second portion of said trigger means being moved with respect to the bar during movement of the trigger means from its second position to its first position so that said second portion moves:

(a) through a first range of positions wherein it restrains movement of said bar from its second position to its first position, and then
(b) through a second range of positions, wherein said bar is released for movement to its first position from its second position.

9. A mechanism as set forth in claim 6 further comprising a rotatably mounted cam adapted to interact with the trigger means and movable with respect to said trigger means between
(a) a first location wherein said cam permits free and uninterrupted movement of said trigger means between its first position and its second position,
(b) a second location wherein said cam prevents movement of said trigger means to its second position from its first position, and
(c) a third location wherein said cam prevents movement of said trigger means to its first position from its second position;
said cam interacting with the trigger means when said cam is moved to its third location to effect simultaneous movement of said trigger means from its first position to its second position.

10. A mechanism for actuating a motion picture camera comprising:
(a) a camera activating means comprising:
(i) an activating bar movable between a first position wherein the camera is inoperative and a second position wherein the camera is rendered operative,
(ii) a spring mounted on the bar adapted to bias the bar towards its second position,
(b) trigger means movable between a first position and a second position for effecting movement of the bar from the first position of the bar to the second position of the bar, the trigger means comprising:
(i) a first portion engageable with the spring when the trigger means moves from its first position to its second position so that the spring can react against said first portion to therefore bias the bar from its first position toward its second position,
(ii) a second portion movable with respect to the bar, as the trigger means moves from its first position to its second position, to move:
(1) through a first range of positions wherein it restrains movement of said bar from its first position to its second position, and then
(2) through a second range of positions wherein it releases the bar for movement to its second position from its first position; and
(iii) a third portion forming a cam engageable surface,
(c) control means comprising a rotatably mounted cam adapted to interact with the cam-engageable surface of the trigger means and movable with respect to said trigger means between:
(i) a first location wherein said cam permits movement of said trigger means between its first position and its second position,
(ii) a second location wherein said cam prevents movement of said trigger means to its second position from its first position, and
(iii) a third location wherein said cam prevents movement of said trigger means to its first position from its second position;
said cam interacting with the cam-engaging surface of said trigger means when said cam is moved to its third location to effect simultaneous movement of said trigger means from its first position to its second position.

11. A mechanism as set forth in claim 10 wherein said camera activating means further comprises means for returning the bar from its second position to its first position; said second portion of said trigger means being moved with respect to the bar during movement of the trigger means from its second position to its first position so that said second portion moves:
(a) through a first range of positions wherein it restrains movement of said bar from its second position to its first position, and then
(b) through a second range of positions, wherein said bar is released for return movement of its first position from its second position.

12. In a motion picture camera having an electric power source, an electric motor which is energized from the power source, a power train driven by the motor, an electrical switch having a pair of contacts for controlling operation of the motor, and a mechanism for activating the camera by opening and closing said contacts, the improvement comprising, in combination:
(a) camera activating means comprising:
(i) an activating bar mounted for movement between a first position wherein the camera is inoperative and a second position wherein the bar urges the electrical contacts together thereby to render the camera operative:
(ii) a spring mounted on the bar for biasing the bar toward its second position;
(iii) spring means operatively connected to the bar for biasing the bar toward its first position,
(b) pivotally mounted trigger means movable between a first position, wherein the camera is inoperative, and a second position, wherein the camera is operative, for effecting movement of the bar from the first position of the bar to the second position of the bar, the trigger means comprising:
(i) a trigger portion adapted to be manually engaged and engageable with the bar-mounted spring for biasing the bar from its first position toward its second position, and
(ii) a plate having a pin projecting perpendicularly therefrom and a cam-engageable surface, said plate being movable with the trigger portion and movable with respect to the bar as the trigger means moves from its first position to its second position to move:
(1) through a first range of positions wherein the pin engages a flange on the bar to block movement thereof from its first position to its second position, and then
(2) through a second range of positions wherein the pin releases the flange to permit movement of the bar to its second position from its first position,
and as the trigger means moves from its second position to its first position to move
(3) through a first range of positions wherein the pin again engages the flange and blocks movement of the bar from its second position to its first position, and then
(4) through a second range of positions, wherein the pin releases the flange to permit return movement of the bar to its first position from its second position, and
(c) control means comprising a cam operatively engageable with said plate and mounted within the camera housing, said cam being mounted for movement with respect to said trigger means between:
(i) a first location wherein said cam permits free movement of said trigger means between its first position and its second position, and
(ii) a second location wherein said cam interacts with said plate surface to prevent movement of said trigger means to its second position from its first position,
(iii) a third location wherein said cam interacts with said plate to prevent movement of said trigger means to its first position from its second position, said control means further comprising a manually engageable rotatably-mounted 3-position knob, disposed outside the camera housing and directly connected to and movable with said cam so that said knob can rotate said cam from any one of its locations to any other one of its locations with movement of said knob to rotate said cam to its third location effecting simultaneous movement of said trigger means from its first to its second position.

References Cited

UNITED STATES PATENTS

| | | | |
|---|---|---|---|
| 2,493,443 | 1/1950 | Cisski | 352—178 |
| 3,048,082 | 8/1962 | Ferrari et al. | 352—178 |
| 3,376,094 | 4/1968 | Baginski | 352—178 XR |

H. O. JONES, Primary Examiner

U.S. Cl. X.R.

352—178